(12) United States Patent
Cumbee

(10) Patent No.: US 7,020,338 B1
(45) Date of Patent: Mar. 28, 2006

(54) METHOD OF IDENTIFYING SCRIPT OF LINE OF TEXT

(75) Inventor: Carson S. Cumbee, Hanover, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 848 days.

(21) Appl. No.: 10/117,896

(22) Filed: Apr. 8, 2002

(51) Int. Cl.
G06K 9/72 (2006.01)

(52) U.S. Cl. ............... 382/230; 382/296; 382/298; 704/8

(58) Field of Classification Search ............ 382/160, 382/174, 203, 229, 230, 296, 298; 704/8
See application file for complete search history.

(56) References Cited

U.S. PATENT DOCUMENTS

| | | | | |
|---|---|---|---|---|
| 5,060,276 | A | * | 10/1991 | Morris et al. ............ 382/151 |
| 5,062,143 | A | * | 10/1991 | Schmitt ............ 382/230 |
| 5,410,611 | A | * | 4/1995 | Huttenlocher et al. ...... 382/177 |
| 5,418,951 | A | * | 5/1995 | Damashek ............ 707/5 |
| 5,442,715 | A | | 8/1995 | Gaborski et al. |
| 5,444,797 | A | | 8/1995 | Spitz et al. |
| 5,745,600 | A | * | 4/1998 | Chen et al. ............ 382/218 |
| 5,844,991 | A | | 12/1998 | Hochberg et al. |
| 5,933,525 | A | | 8/1999 | Makhoul et al. |
| 5,982,933 | A | * | 11/1999 | Yoshii et al. ............ 382/226 |
| 5,991,714 | A | | 11/1999 | Shaner |
| 6,005,986 | A | | 12/1999 | Ratner |
| 6,009,392 | A | * | 12/1999 | Kanevsky et al. ........ 704/245 |
| 6,047,251 | A | * | 4/2000 | Pon et al. ............ 704/1 |
| 6,061,646 | A | * | 5/2000 | Martino et al. ............ 704/3 |
| 6,157,905 | A | | 12/2000 | Powell |
| 6,246,976 | B1 | | 6/2001 | Mukaigawa et al. |
| 6,253,173 | B1 | * | 6/2001 | Ma ............ 704/222 |

(Continued)

OTHER PUBLICATIONS

Parisse ("Global Word Shape Processing in Off-Line Recognition of Handwriting," IEEE Transactions on Pattern Recognition and Machine Intelligence, vol. 18, No. 4, Apr. 1996, pp. 460-464).*

(Continued)

Primary Examiner—Bhavesh M. Mehta
Assistant Examiner—Yubin Hung
(74) Attorney, Agent, or Firm—Robert D. Morelli

(57) ABSTRACT

A method of identifying the script of a line of text by first assigning a weight to each n-gram in a group of documents of known scripts, where each n-gram is a sequence of numbers representing k-mean cluster centroids of a known script to which character segments in the documents of known scripts most closely match. A line of text is identified, where the line of text is made up of pixels. The identified line of text is cropped so that only a percentage of the pixels remain. The cropped line is vertically and horizontally rescaled into gray-scale pixels. The vertical gray-scale pixels are replaced with the sequence number of a k-means cluster centroid of a known script to which it most closely matches. The n-grams of the number sequence that represents the line of text is scored against the n-gram weights of the documents of known text. The highest score of the line of text is identified and compared to the scores of the documents of known scripts. The script of the line of text is determined to be the script of the document against which the line of text scores the highest.

17 Claims, 2 Drawing Sheets

U.S. PATENT DOCUMENTS 6,272,456 B1     8/2001    de Campos
6,327,386 B1    12/2001    Mao et al.
6,404,900 B1 *   6/2002    Qian et al. .................. 382/103
6,470,094 B1 * 10/2002    Lienhart et al. ............ 382/176
6,658,151 B1 * 12/2003    Lee et al. ................... 382/229
6,704,698 B1 *   3/2004    Paulsen et al. ................ 704/1

OTHER PUBLICATIONS

A. L. Spitz, "Determination of the Script and Language Content of Document Images," IEEE Transactions on Pattern Analysis and Machine Intelligence, vol. 19, Nov. 3, 1997.

* cited by examiner

METHOD OF IDENTIFYING SCRIPT OF LINE OF TEXT

(U) FIELD OF THE INVENTION

The present invention relates, in general, to image analysis and, in particular, to the classification of a line of text.

BACKGROUND OF THE INVENTION

Script identification is a useful preprocessing step in automatic document recognition. Most optical character recognition (OCR) devices are trained to recognize a limited set of scripts. If an OCR device was presented with a document that includes text printed in a script for which the OCR device was not trained to recognize then the OCR device would not be able to process the document correctly. So, there is a need for a method of identifying each script in which a document is printed so that an OCR device that was trained in all of the scripts can be identified and used to process the document.

A. L. Spitz, in an article entitled "Determination of the Script and Language Content of Document Images," *IEEE Transactions on Pattern Analysis and Machine Intelligence*, Vol. 19, No. 3, 1997, discloses a method of identifying the script of a document of unknown script by using the topographical features (e.g., concavity) of components to determine whether or not the document is of an Asian script or a European script. A further set of features are then used to determine the language represented by the script of the document.

U.S. Pat. No. 5,062,143, entitled "TRIGRAM-BASED METHOD OF LANGUAGE IDENTIFICATION," discloses a method of identifying language by comparing the trigrams of a sample of an unknown language against a sample of trigrams from various languages. The method of the present invention is more involved than the trigram method of U.S. Pat. No. 5,062,143. U.S. Pat. No. 5,062,143 is hereby incorporated by reference into the specification of the present invention.

U.S. Pat. No. 5,442,715, entitled "METHOD AND APPARATUS FOR CURSIVE SCRIPT RECOGNITION," discloses a method of identifying cursive script by segmenting a cursive word and using a scanning window to recognize individual characters of the word. The method of the present invention does not use a scanning window to identify individual characters of a word. U.S. Pat. No. 5,442,715 is hereby incorporated by reference into the specification of the present invention.

U.S. Pat. No. 5,444,797, entitled "METHOD AND APPARATUS FOR AUTOMATIC CHARACTER SCRIPT DETERMINATION," discloses a method of identifying script by generating connected components from the pixels of the image in question, placing a bounding box around each identified connected component, determining the centroid of each bounding box, determining the feature within each bounding box, and comparing the features to features known script types to determine the script type of the image in question. The method of the present invention does not generate connected components, employ bounding boxes, determine centroids, or determine feature as does the method of U.S. Pat. No. 5,444,797. U.S. Pat. No. 5,444,797 is hereby incorporated by reference into the specification of the present invention.

U.S. Pat. No. 5,844,991, entitled "SCRIPT IDENTIFICATION FROM IMAGES USING CLUSTER-BASED TEMPLATES," discloses a method of identifying the script of a document of unknown script by comparing the components of the document against templates of various scripts. The templates for a particular script are derived from a whole page of training text in that script. Each template is a cluster of similar connected components found on the page of training text. Each template is assigned a reliability score. Components in a document of unknown script are then compared to the templates of each script, and the script is given points for each successful comparison. The script that gets the most points is declared the script of the document in question. The present invention does not use a template comprised of a cluster of similar connected components. U.S. Pat. No. 5,844,991 is hereby incorporated by reference into the specification of the present invention.

U.S. Pat. No. 5,933,525, entitled "LANGUAGE-INDEPENDENT AND SEGMENTATION-FREE OPTICAL CHARACTER RECOGNITION SYSTEM AND METHOD," discloses the utility of considering an image of a document as a collection of lines of text, considering a line of text as a sequence of vectors, and using a Hidden Markov Model to analyze the document. The present invention does not use a Hidden Markov Model. U.S. Pat. No. 5,933,525 is hereby incorporated by reference into the specification of the present invention.

U.S. Pat. No. 5,991,714, entitled "METHOD OF IDENTIFYING DATA TYPE AND LOCATING IN A FILE," discloses a method of identifying the data type of a file of unknown data type by performing an n-gram analysis on each unit of text in the file of unknown data type, where the units of text must be known. The method of the present invention does not require that the units of text are known beforehand and does not perform an n-gram analysis at the text unit level. U.S. Pat. No. 5,991,714 is hereby incorporated by reference into the specification of the present invention.

U.S. Pat. No. 6,005,986, entitled "METHOD OF IDENTIFYING THE SCRIPT OF A DOCUMENT IRRESPECTIVE OF ORIENTATION," discloses a method of identifying the script of a document of unknown script by identifying connected pixels, and computing mean positions, extents, and moment values of the pixels. The method of the present invention does not identifying connected pixels and does not compute mean positions, extents, or moment values of pixels. U.S. Pat. No. 6,005,986 is hereby incorporated by reference into the specification of the present invention.

U.S. Pat. No. 6,157,905, entitled "IDENTIFYING LANGUAGE AND CHARACTER SET OF DATA REPRESENTING TEXT," discloses a method of identifying the language of a document of unknown language by using sets of full characters that are tailored to emphasis full character values that tend to be more distinguishable from one language to another. The method of the present invention is not performed at the full character level. U.S. Pat. No. 6,157,905 is hereby incorporated by reference into the specification of the present invention.

U.S. Pat. No. 6,246,976, entitled "APPARATUS, METHOD AND STORAGE MEDIUM FOR IDENTIFYING A COMBINATION OF A LANGUAGE AND ITS CHARACTER CODE SYSTEM," discloses a method of identifying the language of a document of unknown language by using probabilities of occurrence of full character codes. The method of the present invention is not performed at the full character code level. U.S. Pat. No. 6,246,976 is hereby incorporated by reference into the specification of the present invention.

U.S. Pat. No. 6,272,456, entitled "SYSTEM AND METHOD FOR IDENTIFYING THE LANGUAGE OF WRITTEN TEXT HAVING A PLURALITY OF DIFFERENT LENGTH N-GRAM PROFILES," discloses a method of identifying the language of a document of unknown language by performing an n-gram analysis at the letter. The method of the present invention is not performed at the letter level. U.S. Pat. No. 6,272,456 is hereby incorporated by reference into the specification of the present invention.

U.S. Pat. No. 6,327,386, entitled "KEY CHARACTER EXTRACTION AND LEXICON REDUCTION FOR CURSIVE TEXT RECOGNITION," discloses a method of determining whether or not a document in question includes cursive text by identified key characters and using a neural network to estimate the upper and lower bound of the number of key characters in a line of cursive text. The method of the present invention does not identify key characters and does not use a neural network. U.S. Pat. No. 6,327,386 is hereby incorporated by reference into the specification of the present invention.

SUMMARY OF THE INVENTION

It is an object of the present invention to determine the script of a line of text.

It is another object of the present invention to determine the script of a line of text by replacing the text with number that represent k-mean cluster centroids of text components.

It is another object of the present invention to determine the script of a line of text by doing an n-gram analysis on the k-mean cluster centroid numbers that replaced the text.

The present invention is a method of identifying the script type of a line of printed text.

The first step of the method is assigning a weight to each unique n-gram in a series of documents of known script and scoring each document.

The second step of the method is identifying a line of text in a document for which the script of the line of text is unknown.

The third step of the method is cropping the line of text.

The fourth step of the method is resealing the cropped line of text into vertical and horizontal gray-scale pixels.

The fifth step of the method is replacing each set of vertical gray-scale pixels with an identification number of a k-mean cluster centroid of a character segment of a known script to which the set of vertical gray-scale pixels most closely matches.

The sixth step of the method is scoring the numbers that replaced the line of text against the documents of a known script.

The seventh step of the method is identifying the highest score attained by the numbers that replaced line of text.

The eighth step of the method is identifying the document of known script against which the highest score was attained;

The ninth step of the method is declaring the script of the line of text to be the script of the document identified in the eighth step.

The tenth, and final, step of the method is returning to the second step if another line of text of unknown script is desired to be processed.

DETAILED DESCRIPTION

The present invention is a method of identifying the script type of a line of printed text. The present invention may also be used to identify language type, font type, and whether or not text is handprinted.

Figure 1:
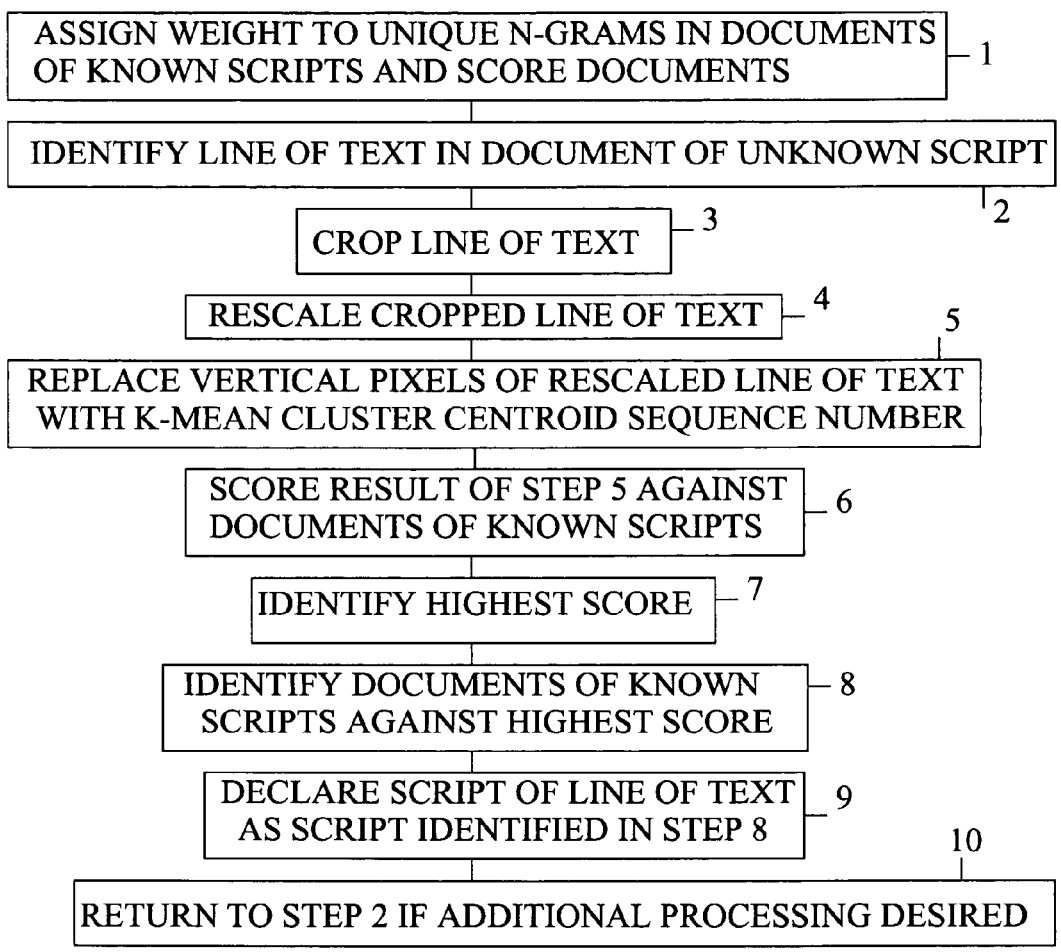
FIG. 1 is a list of steps of the present invention.

FIG. 1 is a list of steps of the present method. The first step 1 of the method is assigning a weight to each unique n-gram in a series of documents of known script and scoring each document. In the present invention, portions of text characters are replaced by numbers. Exactly how this is done in described in more detail below and in FIG. 2. An n-gram for a string of numbers is n contiguous numbers, where n is a user-definable positive integer. The first n-gram in a line of text starts at the beginning of the line. An n-gram that immediately follows another n-gram overlaps the previous n-gram by every number in the n-gram except the first number. However, there would be no overlapping when the n-gram is a one-gram. At least one document of each script of interest is required. The score for each document is the sum of the weights of each n-gram in the document in question.

The second step 2 of the method is identifying a line of text in a document for which the script of the line of text is unknown. The line of text is represented by pixels in columns and rows. Any suitable method of identifying a line of text in the document may be used in the present invention.

The third step 3 of the method is cropping the line of text identified in the second step 2. In the preferred embodiment, the third step is accomplished by first deskewing, or vertically aligning, the line of text. Deskewing may be accomplished by finding the best fit line through the pixels. Next, a horizontal histogram of the pixels in each row the line of text is produced. Each entry in the horizontal histogram is a sum of the pixels in a row of the line of text. Next, selecting the rows of the line of text in which is contained a user-definable percentage of the entire number of pixels in the line of text. In the preferred embodiment, the rows of the line of text that most nearly represent 95% of the total number of pixels in the line of text are selected.

The fourth step 4 of the method is resealing the line of text cropped in the third step 3. The fourth step 4 is accomplished by first dividing the line of text into a user-definable number of sets of vertical (i.e., columns) and horizontal (i.e., rows) gray-scale pixels. In the preferred embodiment, the aspect ratio of the line of text is maintained. It is also preferred that the line of text be divided vertically into eight gray-scale pixels and divided horizontally in a number of gray-scale pixels that would maintain the aspect ration of the line of text.

The fifth step 5 of the method is replacing each set of vertical gray-scale pixels resulting from the fourth step 4 with a sequence number of a k-mean cluster centroid of a component of a character (i.e., a slice of a character) to which the set of vertical gray-scale pixels most closely matches. The fifth step 5 is accomplished by first generating a user-definable number of vertical segments, or slices, of text of a known script. The number of character slices must be sufficiently complete so that any text character of an unknown script may be constructed using the character slices. Each character slice is a k-mean cluster centroid of a user-definable sample of slices of characters in Latin script. That is, a sufficient sample of Latin script is obtained, segmented into sufficiently small slices so that each Latin character is comprised of a number of slices, and a user-definable number of centroids are generated into which all of the slices may be represented. So, the fifth step 5 replaces each slice of the line of text of unknown script with a slice from a known script (e.g., Latin) that most closely resembles the slice of the unknown text so that the resulting slices of the known text look the same as the line of text in the unknown script. However, the line of text is not replaced by the slices of the known script themselves but by the identification numbers of the slices of a known script that most closely resemble the slices of the line of text of unknown script. The numbers are an abstraction that make others steps of the method easier to process. K-mean clustering, an algorithm that is well known by those skilled in the art, is the preferred method of finding centroids. In the preferred embodiment, 64 k-mean cluster centroids are found from slices of Latin characters. The slices are then used in the present invention to represent, in some combination, any character of text in an unknown script. After the k-mean cluster centroids are found, each set of vertical gray-scale pixels found in the fourth step 4 is compared to the k-mean cluster centroids. The identification number of the k-mean cluster centroid that most closely matches a set of vertical gray-scale pixels is assigned to that set of vertical gray-scale pixels. In the preferred embodiment, Euclidean distance is the measure of closeness. The identification number of the k-mean cluster centroid with the shortest Euclidean distance to a set of vertical gray-scale pixels replaces the set of vertical gray-scale pixels.

The sixth step 6 of the method is scoring the result of the fifth step 5 against the user-definable number of documents of known script. That is, each document of known script has its characters slices into segments are replaced with the identification number of the k-mean cluster centroid to which it most closely matches. The sequence of numbers is then analyzed to determine all of the n-grams in this sequence of numbers. Each n-gram is then assigned a weight in step 1. The sixth step 6 of the method is accomplished by first identifying each n-gram in the result of the fifth step. Then, comparing each n-gram identified against the n-grams of each of the user-definable number of documents of known scripts on a per document basis. Then, summing, or accumulating, for each of the user-definable number of documents, the weight of each n-gram for which a match occurred. Then, assigning the resulting summation as the score of the line of text with respect to the document.

The seventh step 7 of the method is identifying the highest score attained in the sixth step 6.

The eighth step 8 of the method is identifying the user-definable document of known script against which the highest score in the sixth step 6 was attained.

The ninth step 9 of the method is declaring the line of text of unknown script as having been written in the script identified in the eighth step 8.

The tenth, and final, step 10 of the method is returning to the second step 2 if another line of text of unknown script is desired to be processed.

Figure 2:
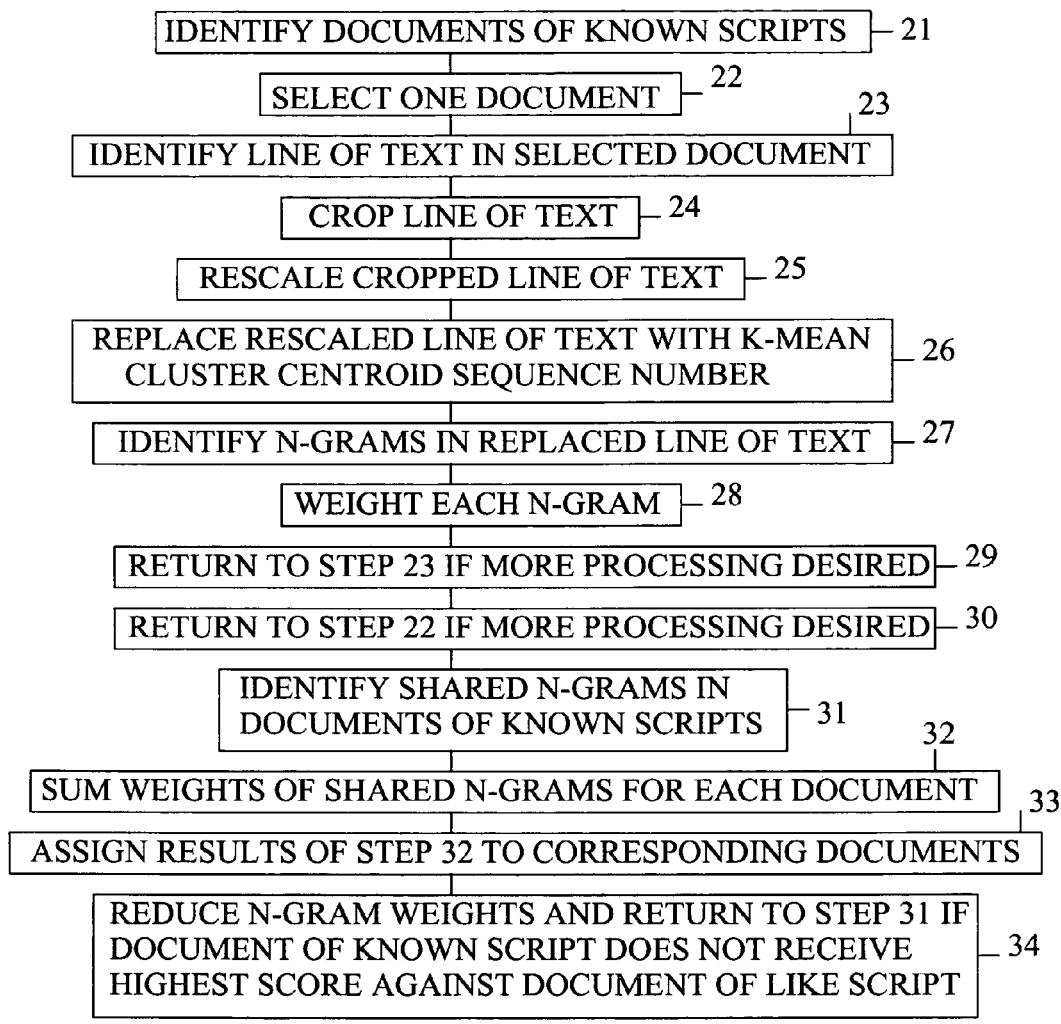
FIG. 2 is a list of steps for assigning weights to n-grams in documents of known script.

FIG. 2 is a list of steps that describe how weights are assigned to the n-grams (i.e., the k-mean cluster centroid identification numbers) of each document of a known script (i.e., the first step 1 of FIG. 1). The first step 21 of FIG. 2 is identifying a user-definable number of documents of known script. At least one document in each script of interest is required.

The second step 22 is selecting one of the documents of known script.

The third step 23 of the method is identifying a line of text in the selected document of known text. Any suitable method for identifying a line of text will suffice.

The fourth step 24 of the method is cropping the line of text identified in the third step 23. The cropping step of the fourth step 24 is the same as the cropping step of the third step 3 listed above and in FIG. 1.

The fifth step 25 of the method listed in FIG. 2 is rescaling the cropped line of text. The rescaling step of the fifth step 25 is the same as the rescaling step of the fourth step 4 listed above and in FIG. 1.

The sixth step 26 of the method listed in FIG. 2 is replacing the rescaled line of text with at least one number associated with k-mean cluster centroids of script components to which at least one portion of the line of text most closely matches. The replacing step of the sixth step 26 is the same as the replacing step of the fifth step 5 listed above and in FIG. 1.

The seventh step 27 of the method listed in FIG. 2 is identifying every n-gram in the replaced line of text.

The eighth step 28 of the method is weighting each identified n-gram. In the preferred embodiment, each n-gram is weighted as follows:

$$W_j = \left( (1/N_j) \sum_i Gij \right) \bigg/ \left( \sum_j \left( 1/N_j \sum_i Gij \right) \right),$$

where $W_j$ is the n-gram weight for script j, where Gij is a normalized frequency of occurrence of n-gram G in line i of script j, and where $N_j$ is a total number of lines in script j.

The ninth step 29 of the method is returning to the third step 23 if another line of text is desired to be processed.

The tenth step 30 of the method is returning to the second step 22 if another document is desired to be processed.

The eleventh step 31 of the method is identifying the n-grams that are shared amongst the various documents of known script.

The twelfth step 32 of the method is summing, for each document of known script, the weights of n-grams shared between each document of known script. Therefore, a document of known script will be summed against all of the documents, including itself.

The thirteenth step 33 of the method is assigning the results of the twelfth step 32 to the corresponding document of known script as its scores with respect to the documents, including itself.

The fourteenth step 34 is reducing n-gram weights by a user-definable amount and returning to the eleventh step 31 for additional processing if one of the documents of known script does not receive its highest score against a document of like script. Otherwise, stopping.

What is claimed is:

1. A method of script identification, comprising the steps of:
   (a) assigning a weight for each of a user-definable number of n-grams in a user-definable number of documents of known scripts, where each of the user-definable number of documents of known scripts is assigned a score equal to the sum of the weights of the n-grams contained therein;
   (b) identifying a line of text in a document of unknown script, where the line of text includes pixels;
   (c) cropping the line of text identified in step (b);
   (d) rescaling the line of text cropped in step (c);
   (e) replacing the line of text rescaled in step (d) with at least one number associated with k-mean cluster centroids of script components to which at least one portion of the line of text most closely matches;

(f) scoring the line of text replaced in step (e) against the user-definable number of documents of known scripts using the n-gram weights assigned in step (a);

(g) identifying the highest score attained in step (f);

(h) identifying the user-definable document of known script against which the highest score in step (f) was attained;

(i) declaring the line of text identified in step (b) as having been written in the script identified in step (h); and (j) returning to step (b) if another line of text of unknown script is desired to be processed.

2. The method of claim 1, wherein said step of assigning a weight for a user-definable number of n-gram in a user-definable number of documents of known scripts is comprised of the steps of:

(a) identifying a user-definable number of documents of known scripts;

(b) selecting one of said user-definable number of documents identified in step (a);

(c) identifying a line of text in the document selected in step (b);

(d) cropping the line of text identified in step (c);

(e) rescaling the line of text cropped in step (d);

(f) replacing the line of text rescaled in step (e) with at least one number associated with k-mean cluster centroids of script components to which at least one portion of the line of text most closely matches;

(g) identifying every n-gram in the result of step (f);

(h) weighting each n-gram in the result of step (g);

(i) returning to step (c) if another line of text is desired to be processed;

(j) returning to step (b) if another document is desired to be processed;

(k) identifying, for each of the user-definable number of documents of known scripts, each set of n-grams that are shared between the document and each of the user-definable number of documents of known scripts;

(l) summing the weights of the n-grams in each set identified in step (k);

(m) assigning the results of step (l) to the corresponding document of known script as its scores; and (n) if one of the user-definable number of documents does not receive its highest score in step (m) against a document of like script then reducing the contributions of each n-gram weight to the scores of the one of said user-definable number of documents by a user-definable amount and returning to step (k) for additional processing, otherwise stopping.

3. The method of claim 1, wherein said step of cropping the line of text identified in step (b) is comprised of the steps of:

(a) deskewing the line of text;

(b) producing a horizontal histogram of the pixels in the line of text, where each entry in the horizontal histogram is a sum of the pixels in a corresponding row of pixels in the line of text; and (c) selecting the lines of pixels in the line of text that represent approximately a user-definable percentage of the sum of pixels in the horizontal histogram.

4. The method of claim 3, wherein the step of selecting the lines of pixels in the line of text that represent approximately a user-definable percentage of the sum of pixels in the horizontal histogram is comprised of the step of selecting the lines of pixels in the line of text that represent approximately ninety-five percent of the sum of pixels in the horizontal histogram.

5. The method of claim 1, wherein said step of rescaling the line of text cropped in step (c) is comprised of the step of dividing the line of text into a user-definable number of vertical gray-scale pixels and a user-definable number of horizontal gray-scale pixels so that an aspect ratio of the line of text is maintained.

6. The method of claim 5, wherein the step of dividing the line of text into a user-definable number of vertical gray-scale pixels and a user-definable number of horizontal gray-scale pixels so that an aspect ratio of the line of text is maintained is comprised of the step of dividing the line of text into eight vertical gray-scale pixels and a user-definable number of horizontal gray-scale pixels so that an aspect ratio of the line of text is maintained.

7. The method of claim 5, wherein said step of replacing the line of text rescaled in step (d) with at least one number associated with k-mean cluster centroid to which at least one portion of the line of text most closely matches is comprised of the steps of:

(a) comparing each of the user-definable number of vertical gray-scale pixels to a user-definable number of k-mean cluster centroids, where each of the user-definable number of k-mean cluster centroids has a unique number; and (b) assigning each of said user-definable number of vertical gray-scale pixels the unique number of the k-mean cluster centroid to which it best matches.

8. The method of claim 7, wherein said step of comparing each of the user-definable number of vertical gray-scale pixels to a user-definable number of k-mean cluster centroids is comprised of the step of comparing each of the user-definable number of vertical gray-scale pixels to a user-definable number of k-mean cluster centroids, where the user-definable number of k-mean cluster centroids are k-mean cluster centroids of a user-definable sample of Latin script.

9. The method of claim 1, wherein said step of scoring the line of text replaced in step (e) against the user-definable number of documents of known scripts using the n-gram weights assigned in step (a) is comprised of the steps of:

(a) identifying each n-gram in the result of step (e);

(b) comparing each n-gram identified in step (a) against the n-grams of each of the user-definable number of documents of known scripts on a per document basis;

(c) accumulating the weights of each n-gram in the user-definable number of documents for which a match occurred in step (b) on a per document basis; and (d) for each document, assigning the result of step (c) as the score of the line of text replaced in step (e) with respect to the document.

10. The method of claim 2, wherein said step of cropping the line of text identified in step (b) is comprised of the steps of:

(a) deskewing the line of text;

(b) producing a horizontal histogram of the pixels in the line of text, where each entry in the horizontal histogram is a sum of the pixels in a corresponding row of pixels in the line of text; and (c) selecting the lines of pixels in the line of text that represent approximately a user-definable percentage of the sum of pixels in the horizontal histogram.

11. The method of claim 10, wherein the step of selecting the lines of pixels in the line of text that represent approximately a user-definable percentage of the sum of pixels in the horizontal histogram is comprised of the step of selecting the lines of pixels in the line of text that represent approximately ninety-five percent of the sum of pixels in the horizontal histogram.

12. The method of claim 11, wherein said step of rescaling the line of text cropped in step (c) is comprised of the step of dividing the line of text into a user-definable number of vertical gray-scale pixels and a user-definable number of horizontal gray-scale pixels so that an aspect ratio of the line of text is maintained.

13. The method of claim 12, wherein the step of dividing the line of text into a user-definable number of vertical gray-scale pixels and a user-definable number of horizontal gray-scale pixels so that an aspect ratio of the line of text is maintained is comprised of the step of dividing the line of text into eight vertical gray-scale pixels and a user-definable number of horizontal gray-scale pixels so that an aspect ratio of the line of text is maintained.

14. The method of claim 13, wherein said step of replacing the line of text rescaled in step (d) with at least one number associated with k-mean cluster centroid to which at least one portion of the line of text most closely matches is comprised of the steps of:
  (a) comparing each of the user-definable number of vertical gray-scale pixels to a user-definable number of k-mean cluster centroids, where each of the user-definable number of k-mean cluster centroids has a unique number; and
  (b) assigning each of said user-definable number of vertical gray-scale pixels the unique number of the k-mean cluster centroid to which it best matches.

15. The method of claim 14, wherein said step of comparing each of the user-definable number of vertical gray-scale pixels to a user-definable number of k-mean cluster centroids is comprised of the step of comparing each of the user-definable number of vertical gray-scale pixels to a user-definable number of k-mean cluster centroids, where the user-definable number of k-mean cluster centroids are k-mean cluster centroids of a user-definable sample of Latin script.

16. The method of claim 15, wherein said step of scoring the line of text replaced in step (e) against the user-definable number of documents of known scripts using the n-gram weights assigned in step (a) is comprised of the steps of:
  (a) identifying each n-gram in the result of step (e);
  (b) comparing each n-gram identified in step (a) against the n-grams of each of the user-definable number of documents of known scripts on a per document basis;
  (c) accumulating the weights of each n-gram in the user-definable number of documents for which a match occurred in step (b) on a per document basis; and
  (d) assigning the result of step (c) as the score of the line of text replaced in step (f).

17. The method of claim 2, wherein said step of weighting each n-gram in the result of step (g) is comprised of the step of calculating $$W_j = \left((1/N_j)\sum_i G_{ij}\right) \bigg/ \left(\sum_j \left(1/N_j \sum_i G_{ij}\right)\right),$$

where $W_j$ is the n-gram weight for script j,
where $G_{ij}$ is a normalized frequency of occurrence of n-gram G in line i of script j, and
where $N_j$ is a total number of lines in script j.

* * * * *